US012621203B2

(12) United States Patent
Hegde et al.

(10) Patent No.: US 12,621,203 B2
(45) Date of Patent: May 5, 2026

(54) NETWORK ADDRESS ASSIGNMENT FAILOVER

(71) Applicant: HEWLETT PACKARD ENTERPRISE DEVELOPMENT LP, Spring, TX (US)

(72) Inventors: Sanjay Kaniyoor Surendra Hegde, Bangalore (IN); Isaac Theogaraj, Bangalore (IN); Ashutosh Nasikkar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/754,591

(22) Filed: Jun. 26, 2024

(65) Prior Publication Data

US 2025/0274340 A1     Aug. 28, 2025

(30) Foreign Application Priority Data

Feb. 22, 2024    (IN) ............................. 202441013018

(51) Int. Cl.
H04L 41/0663        (2022.01)
H04L 61/4552        (2022.01)
H04L 61/5053        (2022.01)

(52) U.S. Cl.
CPC ...... H04L 41/0663 (2013.01); H04L 61/4552 (2022.05); H04L 61/5053 (2022.05)

(58) Field of Classification Search
CPC ............. H04L 41/0663; H04L 61/4552; H04L 61/5053

USPC ........................................................ 709/231
See application file for complete search history.

(56) References Cited

U.S. PATENT DOCUMENTS

| 11,558,454 B2 * | 1/2023 | Gupta ................. H04L 67/1051 |
| 2007/0294563 A1 | 12/2007 | Bose |
| 2018/0280797 A1 * | 10/2018 | Murakami .............. A63F 13/34 |

(Continued)

OTHER PUBLICATIONS

Droms et al., Network Working Group, Internet Draft, DHCP Failover Protocol, Sep. 2003 (263 pages).

(Continued)

*Primary Examiner* — Karen C Tang
(74) *Attorney, Agent, or Firm* — Hewlett Packard Enterprise Patent Department

(57) ABSTRACT

In some examples, a first controller of a cluster of controllers provides a first controller network address assignment service for a first collection of client devices. The first controller detects a communication interruption with a second controller of the cluster of controllers, and determines whether a second controller network address assignment service of the second controller is unavailable, based on a determination of whether a network address assignment was performed within a specified recent time interval at the second controller. Based on determining that the second controller network address assignment service of the second controller is unavailable, the first controller transitions to a partner down state as part of a network address assignment failover in which the first controller provides the first controller network address assignment service for the first collection of client devices and for a second collection of client devices associated with the second controller.

20 Claims, 6 Drawing Sheets

(56) References Cited

U.S. PATENT DOCUMENTS

2025/0156243 A1* 5/2025 Srivastava .......... H04L 67/1008

OTHER PUBLICATIONS

Farinacci et al., Network Working Group, Request for Comments: 2784, Generic Routing Encapsulation (GRE), Mar. 2000 (9 pages).
Kent et al., Network Working Group, Request for Comments: 2401, Security Architecture for the Internet Protocol, Nov. 1998 (66 pages).
Kent, Network Working Group, Request for Comments: 4303, IP Encapsulating Security Payload (ESP), Dec. 2005 (44 pages).
Microsoft Learn, DHCP Failover Communications, Article Aug. 31, 2016 (4 pages).
Microsoft Learn, DHCP Failover Modes, Article Aug. 31, 2016 (3 pages).
Microsoft Learn, Understand and Deploy DHCP Failover, Article Aug. 31, 2016 (3 pages).
Parapurath, J., "PAN-OS Active/Active High Availability, Configuring Active/Active Clusters," May 2011, Palo Alto Networks, 33 pages.
Wan, Y. et al., "The Adaptive Heartbeat Design of High Availability RAID Dual-controller," Apr. 24-26, 2008, 2008 Int'l Conference of Multimedia & Ubiquitous Engineering, pp. 45-50.
Wikipedia, Dynamic Host Configuration Protocol downloaded Jan. 28, 2024 (25 pages).
Wikipedia, Generic Routing Encapsulation downloaded Jan. 28, 2024 (4 pages).
Wikipedia, IPsec downloaded Jan. 28, 2024 (8 pages).
Internet Systems Consortium, "libdhcp_ha.so: High Availability Outage Resilience for Kea Servers," available Nov. 1, 2023, Chapter 16, part 12, <https://kea.readthedocs.io/en/latest/arm/hooks.html>.
Internet Systems Consortium, "Why Choose Kea?," available Nov. 1, 2023, <https://www.isc.org/kea/>.

* cited by examiner

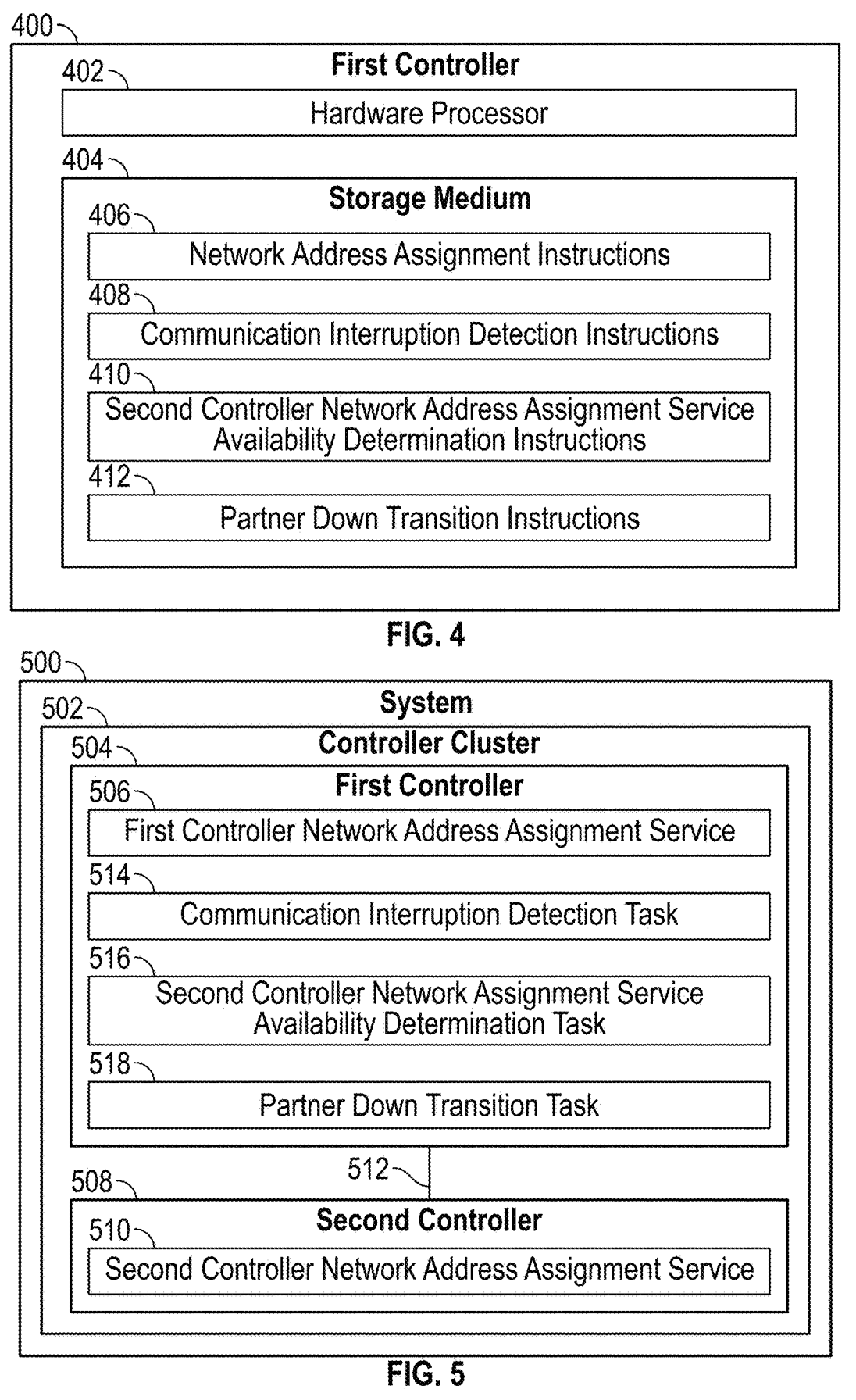

400

First Controller

402

Hardware Processor

404

Storage Medium

406

Network Address Assignment Instructions

408

Communication Interruption Detection Instructions

410

Second Controller Network Address Assignment Service Availability Determination Instructions

412

Partner Down Transition Instructions

System

502

504

Controller Cluster

First Controller

506

First Controller Network Address Assignment Service

514

Communication Interruption Detection Task

516

Second Controller Network Assignment Service Availability Determination Task

518

Partner Down Transition Task

512

508

Second Controller

510

Second Controller Network Address Assignment Service

FIG. 5

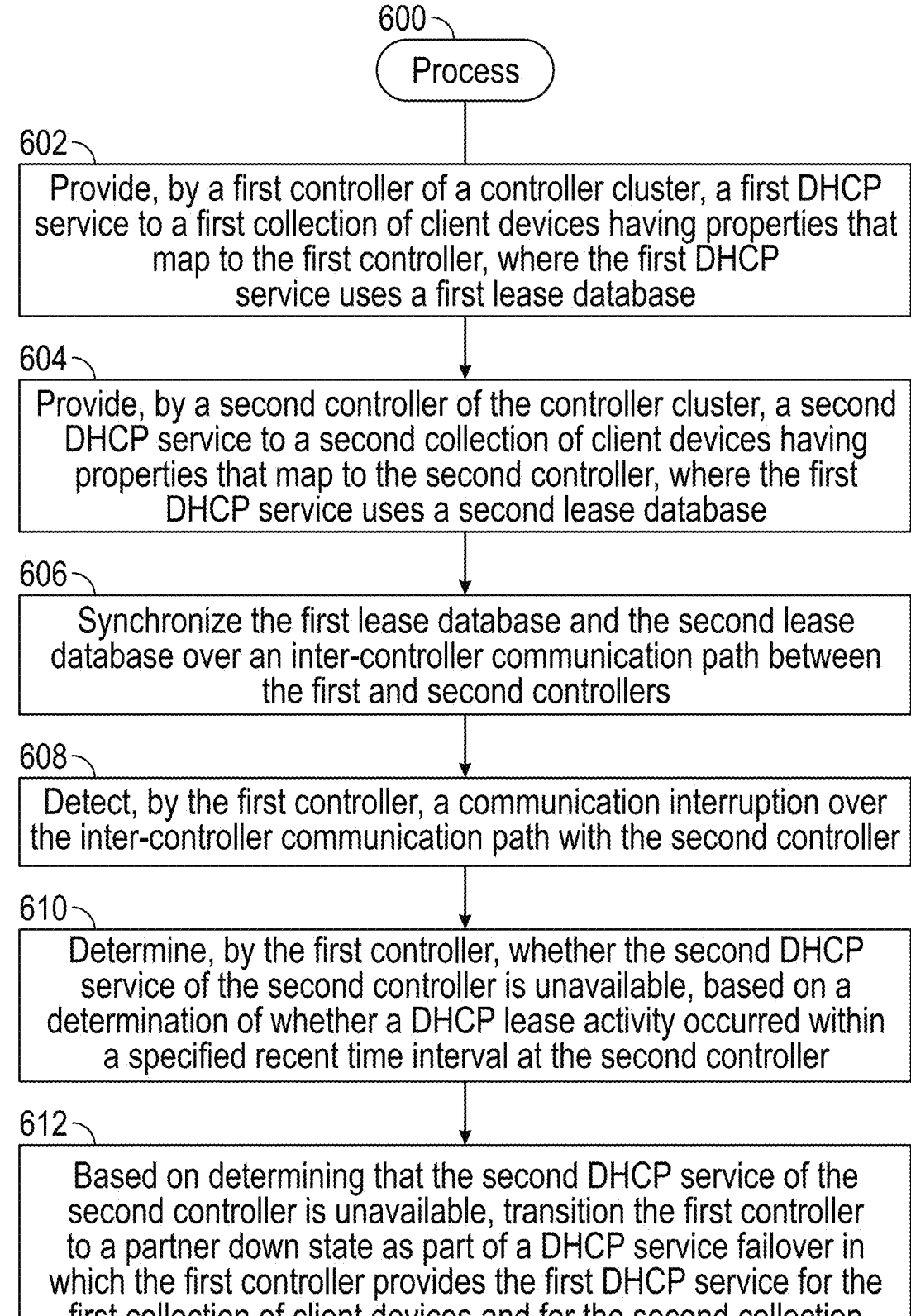

600

Process

602

Provide, by a first controller of a controller cluster, a first DHCP service to a first collection of client devices having properties that map to the first controller, where the first DHCP service uses a first lease database

604

Provide, by a second controller of the controller cluster, a second DHCP service to a second collection of client devices having properties that map to the second controller, where the first DHCP service uses a second lease database

606

Synchronize the first lease database and the second lease database over an inter-controller communication path between the first and second controllers

608

Detect, by the first controller, a communication interruption over the inter-controller communication path with the second controller

610

Determine, by the first controller, whether the second DHCP service of the second controller is unavailable, based on a determination of whether a DHCP lease activity occurred within a specified recent time interval at the second controller

612

Based on determining that the second DHCP service of the second controller is unavailable, transition the first controller to a partner down state as part of a DHCP service failover in which the first controller provides the first DHCP service for the first collection of client devices and for the second collection of client devices

FIG. 6

NETWORK ADDRESS ASSIGNMENT FAILOVER

BACKGROUND

Computing environments such as data centers, cloud environments, or other types of computing environments can provide services for client devices. The client devices are able to access the computing environments over a network.

BRIEF DESCRIPTION OF THE DRAWINGS

Some implementations of the present disclosure are described with respect to the following figures.

FIG. 4 is a block diagram of a controller according to some examples.

FIG. 5 is a block diagram of a system according to some examples.

FIG. 6 is a flow diagram of a process according to some examples.

Figure 1:
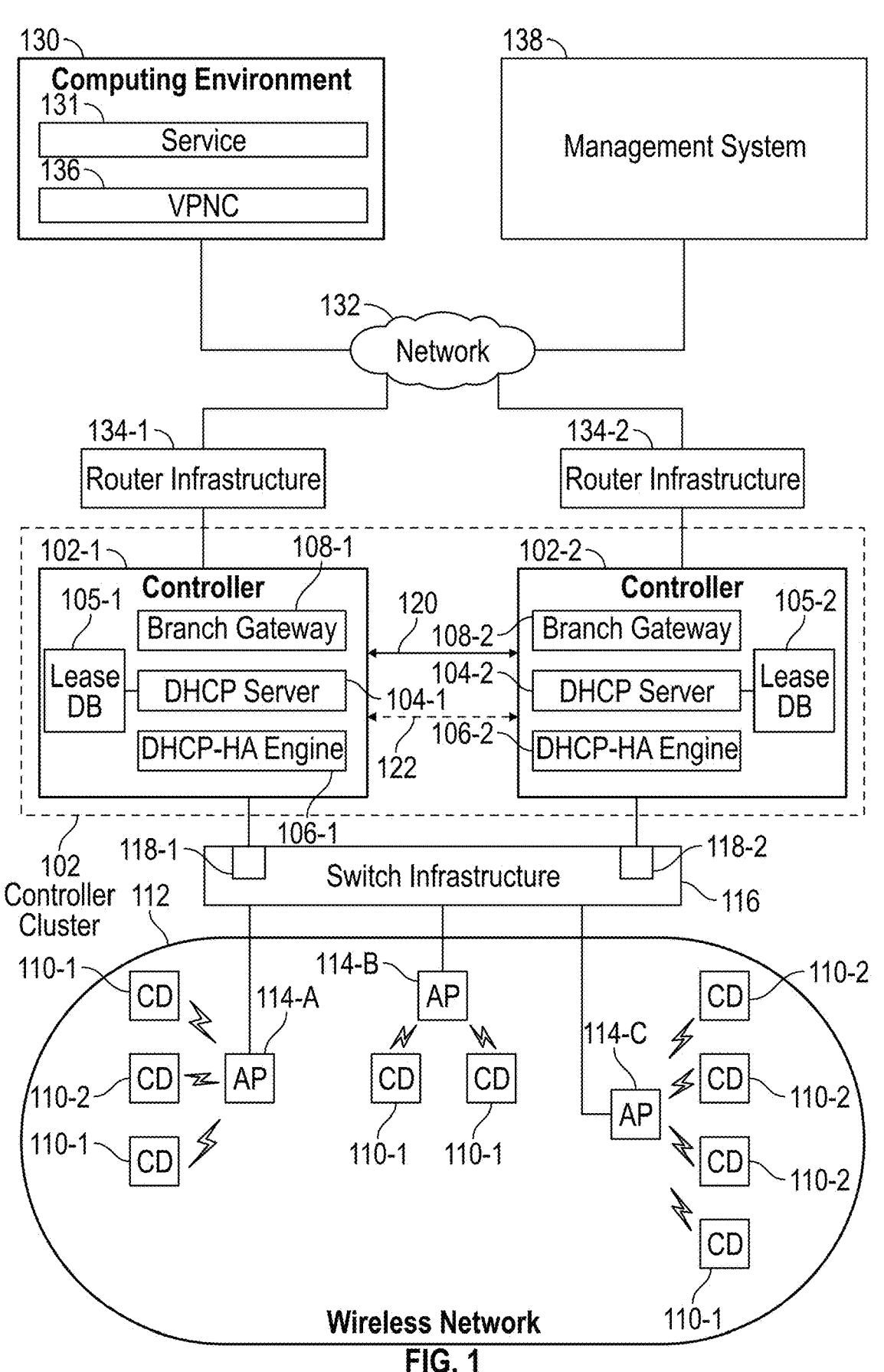
FIG. 1 is a block diagram of a network arrangement that includes a controller cluster, a computing environment, a management system, and client devices, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Client devices can communicate data with a computing environment through network devices of a network arrangement. Examples of network devices include switches, wireless access points, gateways, concentrators, or other network devices. In some examples, a network arrangement can include a controller that has a Dynamic Host Configuration Protocol (DHCP) server for assigning Internet Protocol (IP) addresses to client devices. For example, the DHCP server may receive a DHCP message from a client device, where the DHCP message contains a Media Access Control (MAC) address of the client device. Based on the MAC address, the DHCP server sends, to the client device, a response DHCP message containing the IP address correlated to the MAC address.

Multiple controllers with respective DHCP servers may be included in a controller cluster for redundancy to protect against faults. For example, a two-node controller cluster may include two controllers with their respective DHCP servers. The DHCP servers of the controller cluster can includes a primary DHCP server and a secondary DHCP server. Both the primary and secondary DHCP servers can actively provide DHCP service, with the primary DHCP server serving a first collection of client devices, and the secondary DHCP server serving a second collection of client devices.

The multiple DHCP servers in the controller cluster form a DHCP-High Availability (DHCP-HA) arrangement. If a first DHCP server (serving the first collection of client devices) of the DHCP-HA arrangement were to fail, then a second DHCP server of the DHCP-HA arrangement can take over providing DHCP service to client devices of both the first collection and the second collection.

In some cases, communications between the primary and secondary DHCP servers may be interrupted. The communication interruption between the primary and secondary DHCP servers may be due to a fault of a communication path between the primary and secondary DHCP servers. However, even though communications between the primary and secondary DHCP servers are interrupted, the primary and secondary DHCP servers may continue to be active (i.e., the primary and secondary DHCP servers are able to continue providing DHCP service). In other cases, it is also possible that the communication interruption is caused by a fault of one of the primary and secondary DHCP servers; in this latter case, the faulty DHCP server may no longer be able to provide DHCP service.

In response to a detection of a communication interruption between the primary and secondary DHCP servers, a first DHCP server (referred to as "DHCP server A") in the DHCP-HA arrangement may not be able to make a determination of whether the communication interruption is caused by a communication path fault or a fault of the partner DCHP server (referred to as "DHCP server B") in the DHCP-HA arrangement. In some cases, DHCP server A may simply continue to serve its collection of client devices ("collection A") and not serve the other collection of client devices ("collection B") associated with DHCP server B even though the communication interruption occurred. In such cases, if the communication interruption is caused by a faulty DHCP server B that is no longer able to provide DHCP service, then the client devices of collection B associated with DHCP server B would not be able to obtain IP address assignments (referred to as "leases") from DHCP server B. If a client device of collection B is not able to obtain an IP address from DHCP server B, then the client device would not be able to operate over a network.

On the other hand, if DHCP server A were to take over providing DHCP service to client devices of collection B (and if DHCP server B were to take over providing DHCP service to client devices of collection A) in response to detecting a communication interruption between DHCP servers A and B, then a client device may be receive multiple IP address assignments (potentially including different IP addresses) from DHCP servers A and B if both DHCP servers are still active. A client device receiving multiple IP address assignments from different DHCP servers in response to the same DHCP message may result in faulty operation at the client device since the client device may treat the receipt of multiple IP address assignments as an error condition.

In accordance with some implementations of the present disclosure, techniques or mechanisms are provided in a cluster of controllers ("controller cluster") that provide network address assignment services to determine actions to take in response to detecting a communication interruption between the controllers of the controller cluster. Generally, a network address assignment service assigns a network address to a client device in response to a request from the client device. An example of a network address assignment service is a DHCP service, which assigns an IP address to a client device in response to a DHCP message from the client device. The communication interruption may arise in various scenarios, including, for example: (1) a first scenario in which a fault in a communication path prevents a communication between the controllers of the controller cluster, but the controllers are still actively providing network address assignment services, and (2) a second scenario in which a controller of the controller cluster has experienced a fault that prevents the controller from providing its network address assignment service. In accordance with some implementations of the present disclosure, a given controller of a controller cluster can perform the following actions: (A) not take over the network address assignment service of a partner controller of the controller cluster in response to the communication interruption if the partner controller is still actively providing the partner controller's network address assignment service, and (B) take over the partner controller's network address assignment service in response to the communication interruption if the partner controller is no longer actively providing the partner controller's network address assignment service. Action (A) avoids the situation where multiple controllers of the controller cluster are providing redundant network address assignments in response to a request of a client device. Action (B) allows the functional controller of the controller cluster to provide network address assignment service to client devices that are part of the collection of client devices served by the faulty partner controller.

Techniques or mechanisms according to some implementations can improve the relevant technology and computer functionality associated with providing network address assignment services using a controller cluster by handling communication interruptions and controller faults in a manner that reduces the likelihood of redundant network address assignments that can cause errors at client devices or in network communications, and reduces the likelihood that client devices are not provided with network address assignment services when a controller in a controller cluster experiences a fault.

Examples of client devices can include any or some combination of the following: computers (e.g., desktop computers, notebook computers, server computers, tablet computers, etc.), smartphones, game appliances, vehicles, household appliances, Internet of Things (IoT) devices, or other types of electronic devices.

A controller can be implemented using one or more physical computers. In some cases, multiple controllers of a controller cluster can be implemented on a common computer or a common collection of computers. In such latter examples, the controllers can be executed as virtual computing entities (e.g., virtual machines or VMs, containers, etc.) in one or more computers.

FIG. 1 is a block diagram of an example network arrangement that includes a controller cluster 102, which includes a controller 102-1 and a controller 102-2. Although the example of FIG. 1 shows the controller cluster 102 with a pair of controllers, in other examples, a controller cluster can include more than two controllers.

Each controller 102-1 and 102-2 includes a respective network address assignment server to assign network addresses to corresponding client devices. In some examples, the network address assignment servers include a DHCP server 104-1 in the controller 102-1, and a DHCP server 104-2 in the controller 102-2.

Each controller 102-1 and 102-2 further includes a high availability engine to manage faults associated with the controller cluster 102. A fault of the controller cluster 102 can include a fault of one or more communication paths between the controllers 102-1 and 102-2. Another fault of the controller cluster 102 can include a fault a controller of the controller cluster 102. A fault can refer to a hardware failure or error, a failure or error of machine-readable instructions, or any other condition that causes a component of the controller cluster 102 to not function according to a target functionality. In some examples, the high availability engine in the controller 102-1 is a DHCP-HA engine 106-1, and the high availability engine in the controller 102-2 is a DHCP-HA engine 106-2.

The controller 102-1 further includes a branch gateway 108-1, and the controller 102-2 further includes a branch gateway 108-2. The branch gateways 108-1 and 108-2 are discussed further below. The DHCP server 104-1, the DHCP-HA engine 106-1, and the branch gateway 108-1 can be implemented using hardware processing circuitry of the controller 102-1, or alternatively, using machine-readable instructions executable by a processing resource of the controller 102-1. Similarly, the DHCP server 104-2, the DHCP-HA engine 106-2, and the branch gateway 108-2 can be implemented using hardware processing circuitry of the controller 102-2, or alternatively, using machine-readable instructions executable by a processing resource of the controller 102-2.

Each DHCP server 104-1 or 104-2 is able to assign IP addresses to respective client devices. When both controllers 102-1 and 102-2 are operational (i.e., the controllers are operating according to their target functionalities), the DHCP server 104-1 is responsible for assigning IP addresses to client devices (CDs) 110-1 of a first collection of client devices, and the DHCP server 104-2 is responsible for assigning IP addresses to client devices 110-2 of a second collection of client devices.

The client devices 110-1 and 110-2 are able to communicate in a wireless network 112, which includes access points (APs) 114-A, 114-B, and 114-C with which respective wireless client devices are able to establish wireless connectivity. In other examples, the wireless network 112 can include a different quantity of APs, which can be less than three APs or more than three APs. A client device can associate with an AP, which refers to the client device establishing a wireless connection with the AP such that the client device is able to communicate using the communication resources of the wireless network 112. The wireless network 112 can include a wireless local area network (WLAN), a cellular network, or any other type of wireless network. The APs 114-A, 114-B, and 114-C may operate according to the Institute of Electrical and Electronics Engineers (IEEE) 802.11 standards (also referred to as WI-FI standards). Alternatively, the APs 114-A, 114-B, and 114-C may operate according to cellular protocols or other wireless technologies.

Although FIG. 1 shows an example with a wireless network that includes APs, it is noted that in other examples, the client devices 110-1 and 110-2 can include wired devices connected to a wired network. Techniques or mechanisms according to some examples of the present disclosure are applicable to arrangements including wired client devices.

The APs 114-A, 114-B, and 114-C are connected to a switch infrastructure 116 that includes one or more switches. A switch refers to a network device that forwards data packets along communication paths based on MAC addresses in the data packets. A "data packet" (also referred to as a "data frame," a "data cell," etc.) can refer to any unit of data that can be separately transmitted in a communication path.

The switch infrastructure 116 connects the APs 114-A, 114-B, and 114-C to the controller cluster 102. In the example of FIG. 1, the controller 102-1 can be connected to a port 118-1 of the switch infrastructure 116, and the controller 102-2 can be connected to a port 118-2 of the switch infrastructure 116. The ports 118-1 and 118-2 may be part of the same switch or may be part of different switches of the switch infrastructure 116. A "port" can refer to any communication interface through which electronic devices are able to communicate.

A client device (110-1 or 110-2) that has associated with an AP is able to access a controller in the controller cluster 102 to obtain a network address, such as an IP address assigned by a DHCP server 104-1 or 104-2. In some examples, the client device can broadcast a client request (e.g., a DHCP message) to the controllers 102-1 and 102-2 of the controller cluster 102. A message that is broadcast is intended to be received by multiple target entities, which in this case include the DHCP servers 104-1 and 104-2.

In response to the client request, a designated DHCP server in the controller cluster 102 assigns an IP address to the client device. The assignment of an IP address by a DHCP server is also referred to as a lease, which refers to a temporary assignment of an IP address. The assigned IP address is sent by the designated DHCP server to the client device.

In some examples, the DHCP server that is designated to assign an IP address in response to a client request is the DHCP server selected based on a MAC address in the client request. The MAC address in the client request is the MAC address of the client device that issued the client request. The DHCP server selected from among the DCHP servers of the controller cluster 102 may be based on a value derived from the MAC address in the client request. For example, a hash function can be applied on the MAC address of the client request to produce a hash value. If the hash value falls in a first range of hash values, then the controller 102-1 is selected to respond to the client request. On the other hand, if the hash value falls in a second range of hash values, then the controller 102-2 is selected to respond to the client request. In other examples, instead of applying a hash function to the MAC address in the client request, a different function can be applied to the MAC address (or to any other parameter value) of the client request to produce a selection value that is used to select one of multiple controllers of the controller cluster 102. The DHCP server in the selected controller is used to respond to the client request.

One or more inter-controller communication paths may be established between the controllers of the controller cluster 102. In the example of FIG. 1, two inter-controller communication paths are established between the controllers 102-1 and 102-2. In some examples, the inter-controller communication paths include different tunnels between the controllers 102-1 and 102-2, where the tunnels are established through the switch infrastructure 116. A tunnel refers to a communication path in which a data packet is encapsulated within a packet of another protocol.

Examples of tunnels include an Internet Protocol Security (IPsec) tunnel and a Generic Routing Encapsulation (GRE) tunnel. An IPsec tunnel refers to a tunnel in which a data packet is encrypted and encapsulated according to the IPsec protocol, as described in various Request for Comments (RFCs), including RFC 2401, entitled "Security Architecture for the Internet Protocol," dated November 1998. An IPsec tunnel can perform encapsulation according to the Encapsulating Security Payload (ESP) protocol, as described in RFC 4303, entitled "IP Encapsulating Security Payload (ESP)," dated December 2005.

A GRE tunnel allows a source and destination endpoint of the GRE tunnel to operate as if the source and destination endpoints (in this case the controllers 102-1 and 102-2) have a virtual point-to-point connection with one another. GRE is described in RFC 2784, entitled "Generic Routing Encapsulation (GRE)," dated March 2000.

Although reference is made to an IPsec tunnel and a GRE tunnel, it is noted that other types of communication paths may be employed in other examples. In the ensuing discussion, a first inter-controller communication path between the controllers 102-1 and 102-2 is referred to as a cluster tunnel 120, which may be implemented as an IPsec tunnel. A second inter-controller communication path between the controllers 102-1 and 102-2 is referred to as a peer tunnel 122, which may be implemented as a GRE tunnel.

In some examples, the cluster tunnel 120 and the peer tunnel 122 are examples of downstream communication paths between the controllers 102-1 and 102-2, since the cluster tunnel 120 and the peer tunnel 122 are established through the switch infrastructure 116 that is downstream of the controller cluster 102. A network entity, such as the switch infrastructure 116, is downstream of the controller cluster 102 if the network entity is closer than another entity to client devices that use services of the controller cluster 102.

In contrast, an entity that is upstream of the controller cluster 102 includes a computing environment 130 that provides various services there are accessible by the client devices 110-1 and 110-2. An example of the computing environment 130 is a data center. In other examples, the computing environment 130 can include a cloud computing environment or any other type of computing environment.

The computing environment 130 is accessible through a network 132, such as the Internet or any other type of network. The controller 102-1 is able to access the network 132 through a router infrastructure 134-1 that includes one or more routers, and the controller 102-2 is able to access the network 132 through a router infrastructure 134-2 that includes one or more routers. In other examples, the controllers 102-1 and 102-2 can access the network 132 through the same router infrastructure.

In addition to DHCP servers, the controllers 102-1 and 102-2 include respective branch gateways. For example, the controller 102-1 includes the branch gateway 108-1, and the controller 102-2 includes the branch gateway 108-2. A branch gateway is a type of edge router that can be coupled over multiple network paths through the router infrastructures 134-1, 134-2, such as to the computing environment 130. The network paths from the branch gateway to the computing environment 130 are referred to as "uplink paths." The branch gateway can select one of the uplink paths to use for any client device that is accessing a service 131 of the computing environment 130. The branch gateways 108-1 and 108-2 can be part of a software defined wide area network (SD-WAN) for managing which uplink paths to use for data communications between a client device and the computing environment 130.

In some examples, the computing environment 130 includes a virtual private network (VPN) concentrator (VPNC) 136. The uplink paths are connected to the VPNC 136. A VPNC refers to a network device that manages multiple VPN connections from client devices to the computing environment 130. A VPN includes a secure connection between a client device and the computing environment 130. Although reference is made to using VPNs and VPNCs according to some examples, it is noted that in other examples, other types of connections can be established between client devices and the computing environment 130.

FIG. 1 further depicts a management system 138 that is connected to the network 132. The management system 138 can reside in a cloud computing environment or more generally, can refer to any management system that is remotely located from the controller cluster 102 and which can be used to manage the controller cluster 102. The management system 138 can be implemented using one or more computers.

A DHCP server uses a lease database to record IP addresses assigned in response to client requests from client devices. The DHCP server 104-1 uses a lease database 105-1, and the DHCP server 104-2 uses a lease database 105-2. A lease database includes a repository of leases (IP addresses) that have been assigned by a DHCP server. A lease database can be in the form of a file or any other type of data structure that is stored in a memory of the respective controller 102-1 or 102-2. A DHCP lease refers to a temporary assignment of an IP address to a client device.

Each DHCP server has a pool of IP addresses from which the DHCP server can assign IP addresses to client devices. The DHCP server 104-1 can assign IP addresses from a first pool of IP addresses, and the DHCP server 104-1 can assign IP addresses from a second pool of IP addresses, where the first and second pools are distinct from one another.

The lease databases 105-1 and 105-2 are synchronized with one another. In other words, the lease database 105-1 includes IP addresses assigned by the DHCP server 104-1 to the client devices 110-1, as well as IP addresses assigned by the DHCP server 104-2 to the client devices 110-2, and similarly, the lease database 105-2 includes IP addresses assigned by the DHCP server 104-2 to the client devices 110-2, as well as IP addresses assigned by the DHCP server 104-1 to the client devices 110-1.

The multiple communication paths (including the cluster tunnel 120 and the peer tunnel 122) can be used for different purposes. In some examples, the cluster tunnel 120 (e.g., including an IPsec tunnel) can be used by the controllers 102-1 and 102-2 to securely exchange information with one another, such as for synchronizing the lease databases 105-1 and 105-2. The peer tunnel (e.g., including a GRE tunnel) can be used to support a high availability feature of the controller cluster 102, such that a first branch gateway of a first controller of the controller cluster 102 can use uplink paths of the branch gateway of the partner controller in case uplink paths of the first controller are faulty or overloaded.

In some examples, the controllers 102-1 and 102-2 can use a heartbeat mechanism to detect communication interruptions between the controllers 102-1 and 102-2. A heartbeat mechanism relies on the use of heartbeat messages exchanged between the controllers 102-1 and 102-2. A "heartbeat message" can refer to a packet, an information element, a signal, or any other type of indicator sent from a first entity to a second entity for the purpose of indicating that the first entity is active. The DHCP-HA engine 106-1 in the controller 102-1 can periodically send heartbeat messages to the controller 102-2, and similarly, the DHCP-HA engine 106-2 in the controller 102-2 can periodically send heartbeat messages to the controller 102-1.

In some examples, heartbeat messages can be exchanged between the controllers 102-1 and 102-2 in each of multiple communication paths (including the cluster tunnel 120 and the peer tunnel 122) between the controllers. In other examples, heartbeat messages are exchanged over just one communication path between the controllers 102-1 and 102-2.

A given controller of the controller cluster 102 enters into a communication interrupted state if the DHCP-HA engine in the given controller fails to receive a heartbeat message from a partner controller of the controller cluster 102 within a specified time interval (referred to as a "heartbeat interval" that can be set by an administrator or another entity such as a program or a machine). For example, a DHCP-HA engine periodically transmits a heartbeat message every heartbeat interval. If the given controller does not receive a heartbeat message from the partner controller within the heartbeat interval, the given controller can indicate that a communication interruption has occurred after expiration of the heartbeat interval. The failure to receive heartbeat messages results in a potential split of the controller cluster 102 in which the controllers 102-1 and 102-2 are isolated from one another due to the interruption in communications between the controllers 102-1 and 102-2.

In accordance with some implementations of the present disclosure, the given controller of the controller cluster 102 can perform the following actions: (A) not take over the DHCP service of the partner controller of the controller cluster in response to the communication interruption if the partner controller is still actively providing the partner controller's DHCP service, and (B) take over the partner controller's DHCP service in response to the communication interruption if the partner controller is no longer actively longer providing the partner controller's DHCP service. To support actions (A) and (B), each of the DHCP-HA engines 106-1 and 106-2 can perform a partner-active confirmation process in response to detecting a communication interruption between the controllers 102-1 and 102-2, to check whether the partner controller is still able to provide the partner's DHCP service.

Figure 2A:
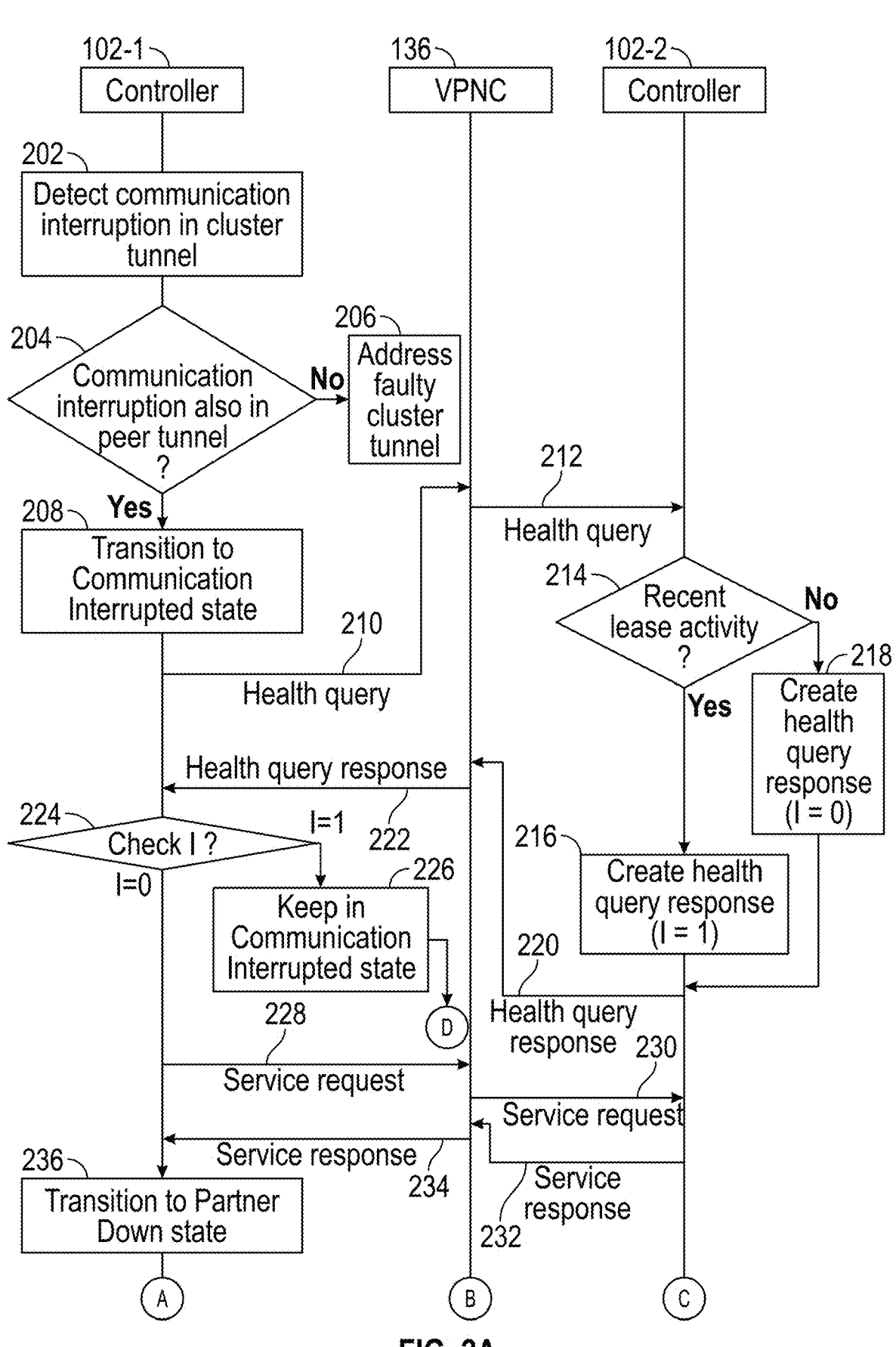
FIG. 2A and FIG. 2B depict a flow diagram of a process for handling a communication interruption between the controllers of a controller cluster, in accordance with some examples.
Figure 2B:
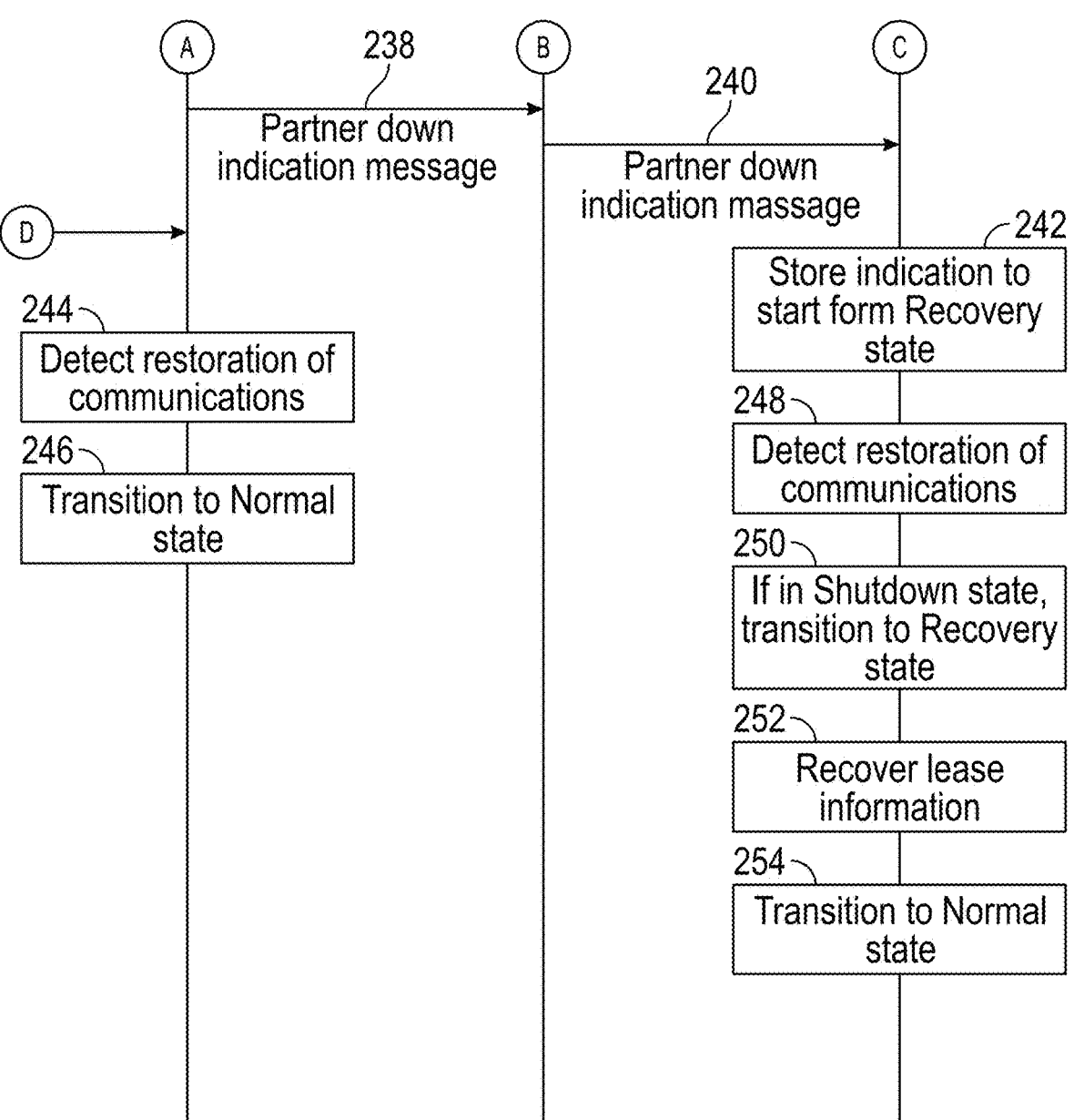

FIG. 2A and FIG. 2B depict a flow diagram of a process for handling a communication interruption between the controllers 102-1 and 102-2 in which DHCP failover can be performed if one of the DHCP servers 104-1 and 104-2 is faulty. Although FIG. 2A and FIG. 2B depict a specific order of tasks, in other examples, a different order of tasks can be used, some of the tasks may be omitted, and other tasks may be added.

In the ensuing discussion, reference is made to various DHCP-HA states as described in Ralph Droms et al., "DHCP Failover Protocol," draft-ietf-dhc-failover-12.txt, dated March 2003. The controller 102-1 or 102-2 can enter into any of the DHCP-HA states. Although reference is made to some example DHCP states, in other examples, the controllers 102-1 and 102-2 can transition among other states.

The DHCP-HA states include a Normal state, a Communication Interrupted state, a Partner Down state, a Recovery state, and a Shutdown state.

The Normal state refers to a state in which both the controllers 102-1 and 102-2 are synchronized with one another, or more specifically, the lease databases 105-1 and 105-2 are synchronized with another. Each synchronized lease database includes leases assigned by the DHCP server associated with the lease database, as well as leases assigned by the partner DHCP server. The other DHCP-HA states are discussed further below.

Assuming that the controller 102-1 is in the Normal state, the DHCP-HA engine 106-1 in the controller 102-1 detects (at 202) a communication interruption in the cluster tunnel 120 between the controllers 102-1 and 102-2. This detection is based on the DHCP-HA engine 106-1 failing to receive a heartbeat message over the cluster tunnel 120 within the heartbeat interval.

In response to detecting the communication interruption over the cluster tunnel 120, the DHCP-HA engine 106-1 checks (at 204) whether a communication interruption between the controllers 102-1 and 102-2 is also present in the peer tunnel 122. The communication interruption in the peer tunnel 122 is indicated if the DHCP-HA engine 106-1 fails to receive a heartbeat message within a heartbeat interval of the peer tunnel 122.

If the DHCP-HA engine 106-1 determines (at 204) that there is no communication interruption in the peer tunnel 122 (e.g., the DHCP-HA engine 106-1 received a heartbeat message in the peer tunnel 122 within the heartbeat interval of the peer tunnel 122), then that is an indication that the partner controller 102-2 is active. The ability to receive heartbeat messages over the peer tunnel 122 indicates that the partner DHCP server 104-2 is active, but that communications over the cluster tunnel 120 experiencing some issues (e.g., a TCP connection may have issues in the cluster tunnel 120). In this case, the DHCP-HA engine 106-1 can raise an alert indicating an issue with the cluster tunnel 120, and the controller 102-1 can perform tasks (at 206) to address the faulty cluster tunnel 120.

However, if the DHCP-HA engine 106-1 determines (at 204) that there is a communication interruption in the peer tunnel 122, the DHCP-HA engine 106-1 transitions (at 208) the controller 102-1 to the Communication Interrupted state. In the Communication Interrupted state, the DHCP server 104-1 can assign IP addresses from the first pool of IP addresses. However, the DHCP server 104-1 in the Communication Interrupted state is not able to assign IP addresses from the second pool of IP addresses, since there is a possibility that the DHCP server 104-2 in the partner controller 102-2 may still be active even though communication interruptions are present in the cluster tunnel 120 and the peer tunnel 122. When the first pool of IP addresses is exhausted, i.e., the DHCP server 104-1 has assigned all IP addresses in the first pool of IP addresses to client devices, then the DHCP server 104-1 would no longer be able to assign any further IP addresses.

After entering the Communication Interrupted state, the DHCP-HA engine 106-1 proceeds to check whether the DHCP server 104-2 in the partner controller 102-2 is active. It is possible that a connectivity through the switch infrastructure 116 between the controllers 102-1 and 102-2 is down, but the controllers 102-1 and 102-2 may still have connectivity through the switch infrastructure 116 to the APs 114-A to 114-C.

Even though communication interruptions are present in the cluster tunnel 120 and the peer tunnel 122, the controller 102-1 still has another communication path in the upstream direction through the computing environment 130. The branch gateway 108-1 in the controller 102-1 has uplink paths to the computing environment 130, and the branch gateway 108-2 in the controller 102-2 has uplink paths to the computing environment 130.

The DHCP-HA engine 106-1 can send (at 210) a health query through an uplink path through the branch gateway 108-1. A tunnel (referred to as an "uplink tunnel") may be established through the uplink path between the controller 106-1 and the VPNC 136 of the computing environment 130. The uplink tunnel may be an IPsec tunnel, for example, or another type of tunnel. The health query is sent through the uplink tunnel to the VPNC 136, which forwards (at 212)

the health query through another tunnel (an uplink tunnel such as an IPsec tunnel) between the VPNC 136 and the partner controller 106-2.

The health query includes a source network address identifying the controller 102-1 as the source and a destination network address identifying the controller 102-2 as the destination. The health query also includes a timestamp recorded by the DHCP-HA engine 106-1 that indicates a time at which the health query was created or sent. The health query is a request to the partner controller 102-2 to indicate whether or not the DHCP server 104-2 of the partner controller 102-2 is active.

In response to receiving the health query, the partner controller 102-2 checks (at 214) whether there was recent lease activity at the controller 102-2, e.g., the controller 102-2 can check the lease database 105-2 to determine whether a lease activity occurred during a specified lease activity time duration relative to the timestamp in the health query. The lease activity can include a renewal of a lease or assigning a new lease. The specified lease activity time duration can include a first time interval before the timestamp, or a second time interval after the timestamp, or both the first and second time intervals. The length of the specified lease activity time duration can be set by an administrator or by another entity.

A lease database includes entries including IP addresses assigned for respective MAC addresses, as well as timestamps indicating when those IP addresses were assigned. A lease is a temporary IP address assignment in which the assigned IP address expires after a set expiration time. A lease renewal refers to the DHCP server renewing the assignment of the IP address and resetting the expiry time for the IP address. When a lease is renewed, the timestamp in the entry corresponding to the renewed lease in the lease database is updated to reflect the time of the renewal. When a new lease is assigned, a new entry is added to an entry of the lease database including the assigned IP address and the timestamp indicating the time of the new lease.

If the controller 102-2 determines that there was a lease activity during the specified time duration relative to the timestamp in the health query, then the controller 102-2 creates (at 216) a health query response (that is responsive to the health query from the controller 102-1) indicating that the DHCP server 104-2 is active. For example, the partner controller 102-2 can set an indicator (I) (e.g., a field, an information element, etc.) in the health query response to a first value (e.g., "1") to indicate that the DHCP server 104-2 is active.

If the partner controller 102-2 determines that there was no lease activity during the specified time duration relative to the timestamp in the health query, then the partner controller 102-2 creates (at 218) a health query response indicating that the DHCP server 104-2 is unavailable. For example, the partner controller 102-2 can set the indicator (I) in the health query response to a second value (e.g., "0") (different from the first value) to indicate that the DHCP server 104-2 is unavailable.

The partner controller 102-2 sends (at 220) the health query response with the indicator (set to the first value or the second value) to the VPNC 136, which forwards (at 222) the health query response to the controller 102-1. In response to receipt of the health query response, the controller 102-1 checks (at 224) the value of the indicator (I) in the health query response. If the indicator (I) is set to the first value (e.g., "1") indicating that the DHCP server 104-2 of the partner controller 102-2 is active, the DHCP-HA engine 106-1 keeps (at 226) the controller 102-1 in the Communication Interrupted state.

Note that although the foregoing refers to the controller 102-1 detecting the communication interruptions of inter-controller communication paths and sending a health query to the partner controller 102-2, the partner controller 102-2 would also perform similar tasks in response to detecting the communication interruptions. If both DHCP servers 104-1 and 104-2 are active while the cluster tunnel 120 and the peer tunnel 122 are interrupted, the controllers 102-1 and 102-2 both operate in the Communication Interrupted state, which means that each DHCP server 104-1 or 104-2 assigns IP addresses from its own pool of IP addresses, and not from the pool of IP addresses associated with the DCHP server in the partner controller.

If the indicator (I) is set to the second value (e.g. "0") indicating that the DHCP server 104-2 of the partner controller 102-2 is unavailable, the DHCP-HA engine 106-1 sends (at 228) a service request to the partner controller 102-2 to cause the partner controller 102-2 to transition to the Shutdown state. The service request is sent to the VPNC 136, which forwards (at 230) the service request to the partner controller 102-2.

Upon transitioning to the Shutdown state in response to the service request, the controller 102-2 sends (at 232) a service response to acknowledge that the controller 102-2 has transitioned to the Shutdown state. The service response is sent from the controller 102-2 to the VPNC 136, which forwards (at 234) the service response to the controller 102-1.

In response to the service response from the controller 102-2, the DHCP-HA engine 106-1 transitions (at 236) the controller 102-1 to the Partner Down state. In the Partner Down state, the DHCP server 104-1 in the controller 102-1 is able to assign IP addresses from its first pool of IP addresses as well as the second pool of IP addresses associated with the partner controller 102-2. The controller 102-1 transitioning to the Partner Down state allows the DHCP server 104-1 to perform DHCP service failover in which the DHCP server 104-1 takes on responsibilities of both the DHCP servers 104-1 and 104-2 during the time that the DHCP server 104-2 is unavailable.

In the Partner Down state, the DHCP server 104-1 is able to serve client devices with MAC addresses that map to both hash value ranges of the DHCP servers 104-1 and 104-2. In other words, the DHCP server 104-1 is able to assign IP addresses to client devices that normally would have been served by the DHCP server 104-2.

As part of transitioning to the Partner Down state, the DHCP-HA engine 106-1 in the controller 102-1 can send (at 238) a Partner Down indication message. The Partner Down indication message is sent to the VPNC 136, which forwards (at 240) the Partner Down indication message to the controller 102-2. The Partner Down indication message indicates to the controller 102-2 that the controller 102-1 has transitioned to the Partner Down state. In response to this Partner Down indication message, the controller 102-2 can store (at 242), in a memory of the controller 102-2, an indication that the controller 102-2 is to start from the Recovery state when the controller 102-2 resumes from the Shutdown state.

At a later point, communications over the cluster tunnel 120 and the peer tunnel 122 are restored. For example, heartbeat messages may again be received by the respective DHCP-HA engines 106-1 and 106-2 over the cluster tunnel 120 and the peer tunnel 122. In response to detecting (at 244)

restoration of communications of the cluster tunnel 120 and the peer tunnel 122 and after some specified amount of time (e.g., a maximum client lead time or MCLT) from the detection of the restoration of communications, the DHCP-HA engine 106-1 transitions (at 246) the controller 102-1 from the Communication Interrupted state (set at 226) or the Partner Down state (set at 236) to the Normal state. The MCLT is a configured maximum amount of time that a DHCP server can extend a lease for a client device beyond the time known by the partner DHCP server. Effectively, the MCLT sets the maximum amount that an IP address assigned by the DHCP server 104-1 to a client device that otherwise would have been served by the partner DHCP server 104-1 is valid.

In response to detecting (at 248) restoration of communications of the cluster tunnel 120 and the peer tunnel 122, if the controller 102-2 was in the Shutdown state, the DHCP-HA engine 106-2 in the partner controller 102-2 transitions (at 250) the controller 102-2 from the Shutdown state to the Recovery state. As noted above, the controller 102-2 can store (at 240), in the memory of the controller 102-2, an indication that the controller 102-2 is to start from the Recovery state when the controller 102-2 resumes from the Shutdown state.

In the Recovery state, the DHCP server 104-2 recovers (at 252) lease information from the lease database 105-1 of the controller 102-1, such as over the cluster tunnel 120. After recovering the lease information, the controller 102-2 can transition (at 254) to the Normal state.

Note that if the DHCP server 104-2 was active during the communications interruption between the controllers 102-1 and 102-2, the controller 102-2 would have been transitioned to the Communication Interrupted state (and would not have been transitioned to the Shutdown state based on tasks 224, 228, and 230). In this alternative scenario, the controller 102-2 would transition from the Communication Interrupted state to the Normal state, such as after the specified amount of time (e.g., MCLT).

In task 222, it is assumed that the controller 102-1 received the health query response from the controller 102-2. In other examples, it may be possible that the controller 102-1 does not receive any health query response, which may be due to the controller 102-2 being non-operational. If the controller 102-1 does not receive a health query response (e.g., after a threshold number of retries) responsive to one or more health queries, the controller 102-1 can assume that the DHCP server 104-2 of the controller 102-2 is not in service, and the DHCP server 104-1 in the controller 102-1 proceeds to the Partner Down state and assigns IP addresses from both the first and second pools of IP addresses.

Figure 3:
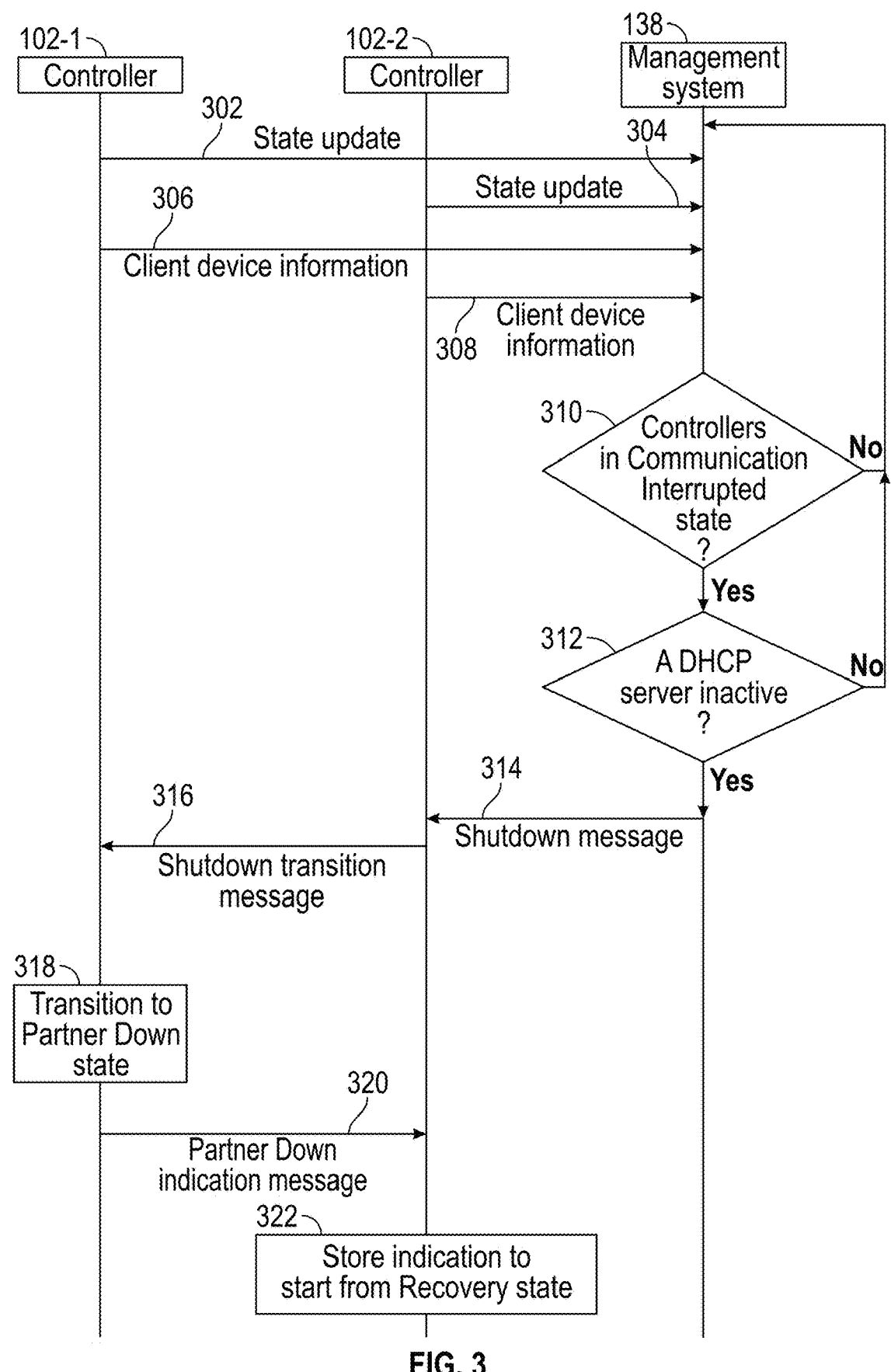
FIG. 3 is a flow diagram of a process for handling a communication interruption between the controllers of a controller cluster, in accordance with further examples.

FIG. 3 is a flow diagram of a management system-controlled process for handling a communication interruption between the controllers 102-1 and 102-2 in which DHCP service failover can be performed if one of the DHCP servers 104-1 and 104-2 is faulty. The management system-controlled process involves the management system 138 of FIG. 1. Although FIG. 3 depicts a specific order of tasks, in other examples, a different order of tasks can be used, some of the tasks may be omitted, and other tasks may be added.

The DHCP-HA engines 106-1 and 106-2 of the respective controllers 102-1 and 102-2 send state updates to the management system 138. The DHCP-HA engine 106-1 sends (at 302) a state update to the management system 138, and the DHCP-HA engine 106-2 sends (at 304) a state update to the management system 138. A state update can include information of a current DHCP-HA state of a controller. The state update may be sent in response to a change in the DHCP-HA state at the controller. The state update may also be sent by the DHCP-HA engine when a DHCP server is initially started.

The controllers 102-1 and 102-2 also send client device information to the management system 138. The controller 102-1 sends (at 306) client device information of client devices serviced by the controller 102-1 to the management system 138, and the controller 102-2 sends (at 308) client device information of client devices serviced by the controller 102-2 to the management system 138. Client device information can include information of new leases or lease renewals, and other information. The client device information may be periodically sent by a controller or may be sent in response to another event.

Based on the state updates from the controllers 102-1 and 102-2, the management system 138 determines (at 310) whether the controllers 102-1 and 102-2 are in the Communication Interrupted state (e.g., due to the controllers not receiving heartbeat messages from one another). If the controllers 102-1 and 102-2 are not in the Communication Interrupted state, the management system 138 returns to receive more state updates from the controllers 102-1 and 102-2.

In response to detecting that the controllers 102-1 and 102-2 are in the Communication Interrupted state, the management system 138 determines (at 312), based on client device information from the controllers 102-1 and 102-2, whether either DHCP server 104-1 or 104-2 is unavailable. This determination may be based on the management system 138 detecting that a given DHCP server has not engaged in any lease activity for a specified lease activity time duration. The given DHCP server is identified as an unavailable DHCP server.

If neither DHCP server 104-1 nor 104-2 is unavailable, the management system 138 takes no further action and returns to receiving further state updates from the controllers 102-1 and 102-2. However, if the management system 138 identifies one of the DCHP servers as unavailable, the management system 138 sends (at 314) a shutdown message to the controller (e.g., the controller 102-2) containing the unavailable DHCP server, to cause the controller to transition to the Shutdown state.

In response to transitioning to the Shutdown state, the controller 102-2 sends (at 316) a shutdown transition message to the controller 102-1 (such as over the uplink paths through the VPNC 136) to inform the controller 102-1 that the controller 102-2 has entered into the Shutdown state. Alternatively, instead of or in addition to the controller 102-2 sending the shutdown transition message to the controller 102-1, the management system 138 can send the shutdown transition message to the controller 102-1.

In response to the shutdown transition message, the controller 102-1 transitions (at 318) to the Partner Down state. In the Partner Down state, the DHCP server 104-1 in the controller 102-1 is able to assign IP addresses from its first pool of IP addresses as well as the second pool of IP addresses associated with the partner controller 102-2. The controller 102-1 transitioning to the Partner Down state allows the DHCP server 104-1 to perform DHCP service failover in which the DHCP server 104-1 takes on responsibilities of both the DHCP servers 104-1 and 104-2 during the time that the DHCP server 104-2 is unavailable.

As part of transitioning to the Partner Down state, the controller 102-1 can send (at 320) a Partner Down indication message to the controller 102-2 (such as over the uplink paths through the VPNC 136). The Partner Down indication message indicates to the controller 102-2 that the controller 102-1 has transitioned to the Partner Down state. In response to this Partner Down indication message, the controller 102-2 can store (at 322), in the memory of the controller 102-2, an indication that the controller 102-2 is to start from the Recovery state when the controller 102-2 resumes from the Shutdown state.

When communications are restored between the controllers 102-1 and 102-2, tasks similar to 244, 246, 248, 250, 252, and 254 may be performed to transition back to the Normal state.

Note that as the controllers 102-1 and 102-2 transition between different states, the controllers 102-1 and 102-2 send state updates to the management system 138.

In the processes depicted in FIGS. 2A-2B and 3, uplink paths between the controller cluster 102 through the computing environment 130 are employed for verifying, by a first controller, whether a partner DHCP server of a partner controller is active during periods of communications interruptions in one or more inter-controller communication paths. The ability to verify whether the partner DHCP server is active allows a first DHCP server of the first controller to take appropriate action during a period of communications interruption, which can include (A) performing a DHCP service failover if the partner DHCP server is unavailable, or (B) continuing to provide DHCP service in which the first DHCP server allocates leases from its own pool of IP addresses (and not the pool of IP addresses of the partner DHCP server) if the partner DHCP server is active. In this manner, if the partner DHCP server is unavailable, client devices that should be serviced by the partner DHCP server would not be deprived of DHCP service. On the other hand, if the partner DHCP server is active during a period of communications interruption, the first DHCP server does not take over the DHCP service of the partner DHCP server, which may result in redundant network address assignments leading to client device errors.

In further examples of the present disclosure, a DHCP-HA engine in a first controller can detect that a partner DHCP server is unavailable based on detecting that an unusually large quantity of client requests (e.g., DHCP messages) for leases is received at the first controller that should have been serviced by the partner controller. A client device broadcasts a client request for a lease, which is received by both the controller 102-1 and 102-2. Each controller receiving a client request produces a hash value based on the MAC address in the client request. If the hash value falls in a first range of hash values, then the controller 102-1 is selected to respond to the client request. On the other hand, if the hash value falls in a second range of hash values, then the controller 102-2 is selected to respond to the client request. If the controller 102-1 repeatedly receives client requests from the same client device (or same collection of client devices) that should have been serviced by the controller 102-2, then the DHCP-HA engine 106-1 in the controller 102-1 can make a determination that the partner DHCP server 104-2 is unavailable, and in response, the DHCP-HA engine 106-1 can transition the controller 102-1 to the Partner Down state to perform DHCP service failover.

The DHCP-HA engine 106-1 can track a quantity of client requests from the same client device (or same collection of client devices) that should have been serviced by the controller 102-2 within a specified time interval. The client requests can include client requests for new leases and client requests for lease renewals. If the tracked quantity exceeds a specified threshold, then that is an indication that the DHCP service 104-2 is unavailable, and the DHCP server 104-1 in the controller 102-1 can take over the DHCP service of the partner DHCP server 104-2.

Client requests for new leases are broadcast by client devices for receipt by the multiple controllers of the controller cluster 102. A client request for lease renewal is unicast by a client device to the controller that previously issued a new lease to the client device. However, if the client device does not obtain a response to the client request for lease renewal of a threshold number of retries, the client device can broadcast the client request for lease renewal for receipt by the multiple controllers of the controller cluster 102.

FIG. 4 is a block diagram of a first controller 400 of a cluster of controllers. The first controller 400 may be the controller 102-1 or 102-2 of FIG. 1, for example. The cluster of controllers can include multiple (two or more) controllers. The first controller 400 includes a hardware processor 402 (or multiple hardware processors). A hardware processor can include a microprocessor, a core of a multi-core micropro-cessor, a microcontroller, a programmable integrated circuit, a programmable gate array, or another hardware processing circuit.

The first controller 400 includes a non-transitory machine-readable or computer-readable storage medium 404 storing machine-readable instructions executable on the hardware processor 402 to perform various tasks. Machine-readable instructions executable on a hardware processor can refer to the instructions executable on a single hardware processor or the instructions executable on multiple hard-ware processors.

The machine-readable instructions include network address assignment instructions 406 to provide a first con-troller network address assignment service for client devices of a first collection of client devices, such as based on properties of the client devices of the first collection of client devices. The properties can include MAC addresses of the client devices, for example. In other examples, other prop-erties of client devices can be used to determine whether the client devices are to be serviced by the first controller 400 or by another controller of the cluster of controllers.

The machine-readable instructions include communica-tion interruption detection instructions 408 to detect a com-munication interruption with a second controller of the cluster of controllers in which communication over a first communication path between the first controller and the second controller is interrupted. The first communication path may include the cluster tunnel 120 of FIG. 1, for example. In some examples, the detection of the communi-cation interruption is further based on detecting that a communication interruption is also present over a second communication path between the first controller and the second controller. The second communication path can include the peer tunnel 122 of FIG. 1, for example.

The machine-readable instructions include second con-troller network address assignment service availability determination instructions 410 to determine whether a sec-ond controller network address assignment service of the second controller is unavailable. The availability determi-nation is based on determining whether a network address assignment was performed within a specified recent time interval at the second controller. The specified recent time interval can be measured relative to a timestamp of a health query sent from the first controller to the second controller (e.g., 210, 212 in FIG. 2A), or alternatively, the specified recent time interval can be a time interval during which no lease activity occurred at the second controller, as monitored by the management system 138 of FIG. 1 (e.g., 312 in FIG. 3).

The machine-readable instructions include partner down transition instructions 412 to, based on determining that the second controller network address assignment service of the second controller is unavailable, transition the first control-ler to a partner down state as part of a network address assignment failover in which the first controller provides the first controller network address assignment service for the client devices of the first collection of client devices and for client devices of a second collection of client devices associated with the second controller.

In some examples, the partner down state is a DHCP-HA Partner Down state. More generally, the partner down state is a state of a controller in which the controller is to take over (or has taken over) the second controller network address assignment service of the second controller as part of the network address assignment failover.

In some examples, the first controller network address assignment service and the second controller network address assignment service are DHCP services, such as provided by the DHCP servers 104-1 and 104-2 of FIG. 1.

In some examples, the determination of whether the network address assignment was performed within the specified recent time interval is based on a check of a network address database, such as a DHCP lease database (e.g., 105-1 or 105-2 of FIG. 1).

In some examples, the network address database includes a first network address database used by the second con-troller, and the first controller uses a second network address database, where the second network address database is synchronized to the first network address database.

In some examples, the first network address database and the second network address database become unsynchro-nized responsive to the first controller providing the first controller network address assignment service for the client devices of the second collection of client devices. The machine-readable instructions can detect that a communi-cation is re-established between the first controller and the second controller, and based on detecting that the commu-nication is re-established between the first controller and the second controller, initiate synchronization of the first net-work address database and the second network address database (e.g., 252 in FIG. 2B).

In some examples, the first controller performs the first controller network address assignment service for the first collection of client devices that are associated with a first subset of MAC addresses, and the second controller per-forms the second controller network address assignment service for the second collection of client devices that are associated with a second subset of MAC addresses.

In some examples, the first controller can detect the communication interruption with the second controller based on detecting a failure to receive a first heartbeat indication over the first communication path, such as a heartbeat message over the cluster tunnel 120 (e.g., an IPsec tunnel).

In some examples, the first controller can detect the communication interruption with the second controller fur-ther based on detecting a failure to receive a second heart-beat indication over a second communication path that is different from the first communication path. The second communication path can be the peer tunnel 122 (e.g., a GRE tunnel) of FIG. 1.

In some examples, responsive to the detecting of the communication interruption with the second controller, the first controller can send, to the second controller, a health query (e.g., 210, 212 in FIG. 2A) over an uplink communication path between the first controller and the second controller, where the uplink communication path is different from the first and second communication paths. For example, the uplink communication path includes a path between the first controller and a VPNC (e.g., 138 in FIG. 1) in a computing environment, and a path between the VPNC and the second controller. The first controller can receive, over the uplink communication path in response to the health query, an indication (e.g., 220, 222 in FIG. 2A) that the second controller network address assignment service of the second controller is unavailable. Determining that the second controller network address assignment service of the second controller is unavailable is based on receiving the indication. The indication is based on the second controller determining that the network address assignment was not performed within the specified recent time interval.

In some examples, determining whether the network address assignment was performed within the specified recent time interval is relative to a timestamp of the health query.

In some examples, based on determining that the second controller network address assignment service of the second controller is unavailable, the machine-readable instructions can cause sending, from the first controller, a shutdown indication (e.g., 228, 230 in FIG. 2A) to the second controller to request that the second controller enter a shutdown state.

In some examples, the first controller can detect a further communication interruption with the second controller. Responsive to detecting the further communication interruption with the second controller, the first controller can send a health query over the second communication path to the second controller. Based on detecting that the second controller has not responded to the health query after a threshold number of retries, the first controller can determine that the second controller network address assignment service of the second controller is unavailable.

In some examples, the determination of whether the network address assignment is performed within the specified recent time interval is performed by a management system (e.g., 138 in FIG. 1) separate from the first controller and the second controller. The first controller can receive an indication (e.g., 316 in FIG. 3) that the management system has caused the second controller to shut down based on the management system determining that the second controller has not performed the network address assignment within the specified recent time interval.

In some examples, the first controller can detect greater than a threshold number of client requests for network address assignments from a same client device or collection of client devices within a specified time interval, where the client requests from the same client device or collection of client devices should have been serviced by the second controller. Based on the detection of greater than the threshold number of client requests from the same client device or collection of client devices should have been serviced by the second controller, the first controller indicates a communication interruption between the first controller and the second controller.

FIG. 5 is a block diagram of a system 500, which can be implemented using one or more computers. The system 500 includes a controller cluster 502 that has a first controller 504 to provide a first controller network address assignment service 506 and a second controller 508 to provide a second controller network address assignment service 510. The first controller 504 has an inter-controller communication path 512 to the second controller 508.

The first controller 504 is able to perform various tasks in accordance with some examples of the present disclosure. The tasks include a communication interruption detection task 514 to detect a communication interruption over the inter-controller communication path 512 with the second controller 508.

The tasks include a second controller network address assignment service availability determination task 516 to determine whether the second controller network address assignment service 510 of the second controller 508 is unavailable. The determination is based on determining whether a network address assignment was performed within a specified recent time interval at the second controller 508.

The tasks include a partner down transition task 518 to, based on determining that the second controller network address assignment service 510 of the second controller 508 is unavailable, transition the first controller 504 to a partner down state as part of a network address assignment failover in which the first controller 504 provides the first controller network address assignment service 506 for client devices of a first collection of client devices associated with the first controller and for client devices of a second collection of client devices associated with the second controller.

In some examples, responsive to transitioning to the partner down state, the first controller 504 sends a partner down indication (e.g., 238 in FIG. 2B) to the second controller 508. Responsive to the partner down indication from the first controller 504, the second controller 508 stores (e.g., 242 in FIG. 2B) an indication that the second controller when transitioning from an unavailable state is to enter a recovery state. In the recovery state, the second controller 508 synchronizes a database of assigned network addresses (e.g., a DHCP lease database) associated with the second controller 508 with a database of assigned network addresses (e.g., a DHCP lease database) associated with the first controller 504.

FIG. 6 is a flow diagram of a process 600 according to some examples. The process 600 includes providing (at 602), by a first controller of a controller cluster, a first DHCP service to a first collection of client devices having properties that map to the first controller, where the first DHCP service uses a first lease database. The properties can include MAC addresses or other properties.

The process 600 includes providing (at 604), by a second controller of the controller cluster, a second DHCP service to a second collection of client devices having properties that map to the second controller, where the first DHCP service uses a second lease database.

The process 600 includes synchronizing (at 606) the first lease database and the second lease database over an inter-controller communication path between the first and second controllers. An example of the inter-controller communication path is the cluster tunnel 120 of FIG. 1.

The process 600 includes detecting (at 608), by the first controller, a communication interruption over the inter-controller communication path with the second controller. The process 600 includes determining (at 610), by the first controller, whether the second DHCP service of the second controller is unavailable, based on a determination of whether a DHCP lease activity occurred within a specified recent time interval at the second controller.

The process 600 includes, based on determining that the second DHCP service of the second controller is unavailable, transitioning (at 612) the first controller to a partner down state as part of a DHCP service failover in which the first controller provides the first DHCP service for the first collection of client devices and for the second collection of client devices.

A storage medium (e.g., 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A first controller of a cluster of controllers, the first controller comprising:

a hardware processor; and a non-transitory storage medium storing instructions executable on the hardware processor to:

provide a first controller network address assignment service for client devices of a first collection of client devices;

detect a communication interruption with a second controller of the cluster of controllers in which communication over a first communication path between the first controller and the second controller is interrupted;

determine whether a second controller network address assignment service of the second controller is unavailable, based on a determination of whether a network address assignment was performed within a specified recent time interval at the second controller; and based on determining that the second controller network address assignment service of the second controller is unavailable, transition the first controller to a partner down state as part of a network address assignment failover in which the first controller provides the first controller network address assignment service for the client devices of the first collection of client devices and for client devices of a second collection of client devices associated with the second controller.

2. The first controller of claim 1, wherein the first controller network address assignment service and the second controller network address assignment service are Dynamic Host Configuration Protocol (DHCP) services.

3. The first controller of claim 1, wherein the determination of whether the network address assignment was performed within the specified recent time interval is based on a check of a network address database.

4. The first controller of claim 3, wherein the network address database comprises a first network address database used by the second controller, and the instructions are executable on the hardware processor to:

use a second network address database at the first controller, the second network address database being synchronized to the first network address database.

5. The first controller of claim 4, wherein the first network address database and the second network address database become unsynchronized responsive to the first controller providing the first controller network address assignment service for the client devices of the second collection of client devices, and wherein the instructions are executable on the hardware processor to:

detect that a communication is re-established between the first controller and the second controller; and based on detecting that the communication is re-established between the first controller and the second controller, initiate synchronization of the first network address database and the second network address database.

6. The first controller of claim 4, wherein the first network address database and the second network address database are Internet Protocol (IP) address lease databases.

7. The first controller of claim 1, wherein the first controller is to perform the first controller network address assignment service for the first collection of client devices that are associated with a first subset of Media Access Control (MAC) addresses, and the second controller is to perform the second controller network address assignment service for the second collection of client devices that are associated with a second subset of MAC addresses.

8. The first controller of claim 1, wherein the instructions are executable on the hardware processor to:

detect the communication interruption with the second controller based on detecting a failure to receive a first heartbeat indication over the first communication path.

9. The first controller of claim 8, wherein the failure to receive the first heartbeat indication over the first communication path comprises a failure to receive the first heartbeat indication in an Internet Protocol Security (IPsec) tunnel of the first communication path.

10. The first controller of claim 9, wherein the instructions are executable on the hardware processor to:

detect the communication interruption with the second controller further based on detecting a failure to receive a second heartbeat indication over a second communication path that is different from the first communication path.

11. The first controller of claim 1, wherein the instructions are executable on the hardware processor to:

responsive to the detecting of the communication interruption with the second controller, cause sending, from the first controller to the second controller, a health query over a second communication path between the first controller and the second controller, wherein the second communication path is different from the first communication path; and receive, at the first controller over the second communication path in response to the health query, an indication that the second controller network address assignment service of the second controller is unavailable, wherein the determining that the second controller network address assignment service of the second controller is unavailable is based on receiving the indication, and wherein the indication is based on the second controller determining that the network address assignment was not performed within the specified recent time interval.

12. The first controller of claim 11, wherein the determining of whether the network address assignment was performed within the specified recent time interval is relative to a timestamp of the health query.

13. The first controller of claim 1, wherein the instructions are executable on the hardware processor to:

based on determining that the second controller network address assignment service of the second controller is unavailable, cause sending, from the first controller, a shutdown indication to the second controller to request that the second controller enter a shutdown state.

14. The first controller of claim 1, wherein the instructions are executable on the hardware processor to:

detect a further communication interruption with the second controller;

responsive to the detecting of the further communication interruption with the second controller, cause sending, from the first controller, a health query over a second communication path to the second controller; and based on detecting that the second controller has not responded to the health query after a threshold number of retries, determine that the second controller network address assignment service of the second controller is unavailable.

15. The first controller of claim 1, wherein the determination of whether the network address assignment is performed within the specified recent time interval is performed by a management system separate from the first controller and the second controller, and wherein instructions are executable on the hardware processor to:

receive, at the first controller, an indication that the management system has caused the second controller to shut down based on the management system determining that the second controller has not performed the network address assignment within the specified recent time interval.

16. The first controller of claim 1, wherein the instructions are executable on the hardware processor to:

detect, at the first controller, greater than a threshold number of client requests for network address assignments from a same client device or collection of client devices within a specified time interval, wherein the client requests from the same client device or collection of client devices should have been serviced by the second controller; and based on the detection of greater than the threshold number of client requests from the same client device or collection of client devices should have been serviced by the second controller, indicate a communication interruption between the first controller and the second controller.

17. A system comprising:

a controller cluster comprising a first controller to provide a first controller network address assignment service and a second controller to provide a second controller network address assignment service, wherein the first controller has an inter-controller communication path to the second controller, the first controller to:

detect a communication interruption over the inter-controller communication path with the second controller;

determine whether the second controller network address assignment service of the second controller is unavailable, based on a determination of whether a network address assignment was performed within a specified recent time interval at the second controller; and based on determining that the second controller network address assignment service of the second controller is unavailable, transition the first controller to a partner down state as part of a network address assignment failover in which the first controller provides the first controller network address assignment service for client devices of a first collection of client devices associated with the first controller and for client devices of a second collection of client devices associated with the second controller.

18. The system of claim 17, wherein the first controller is to:

responsive to transitioning to the partner down state, send, from the first controller, a partner down indication to the second controller, wherein the second controller is to:

responsive to the partner down indication from the first controller, store an indication that the second controller when transitioning from an unavailable state is to enter a recovery state; and in the recovery state, synchronize a database of assigned network addresses associated with the second controller with a database of assigned network addresses associated with the first controller.

19. A method comprising:

providing, by a first controller of a controller cluster, a first Dynamic Host Configuration Protocol (DHCP) service to a first collection of client devices having properties that map to the first controller, wherein the first DHCP service uses a first lease database;

providing, by a second controller of the controller cluster, a second DHCP service to a second collection of client devices having properties that map to the second controller, wherein the first DHCP service uses a second lease database;

synchronizing the first lease database and the second lease database over an inter-controller communication path between the first and second controllers;

detecting, by the first controller, a communication interruption over the inter-controller communication path with the second controller;

determining, by the first controller, whether the second DHCP service of the second controller is unavailable, based on a determination of whether a DHCP lease activity occurred within a specified recent time interval at the second controller; and based on determining that the second DHCP service of the second controller is unavailable, transitioning the first controller to a partner down state as part of a DHCP service failover in which the first controller provides the first DHCP service for the first collection of client devices and for the second collection of client devices.

20. The method of claim 19, wherein the determination of whether the DHCP lease activity occurred within the specified recent time interval at the second controller is based on information communicated over a second communication path through a computing environment comprising a service to be accessed by client devices of the first collection of client devices and the second collection of client devices.

* * * * *

24